Jan. 26, 1932.  W. A. CHRYST  1,842,820
CENTRIFUGAL CLUTCH AND SWITCH
Filed July 10, 1928   2 Sheets-Sheet 2

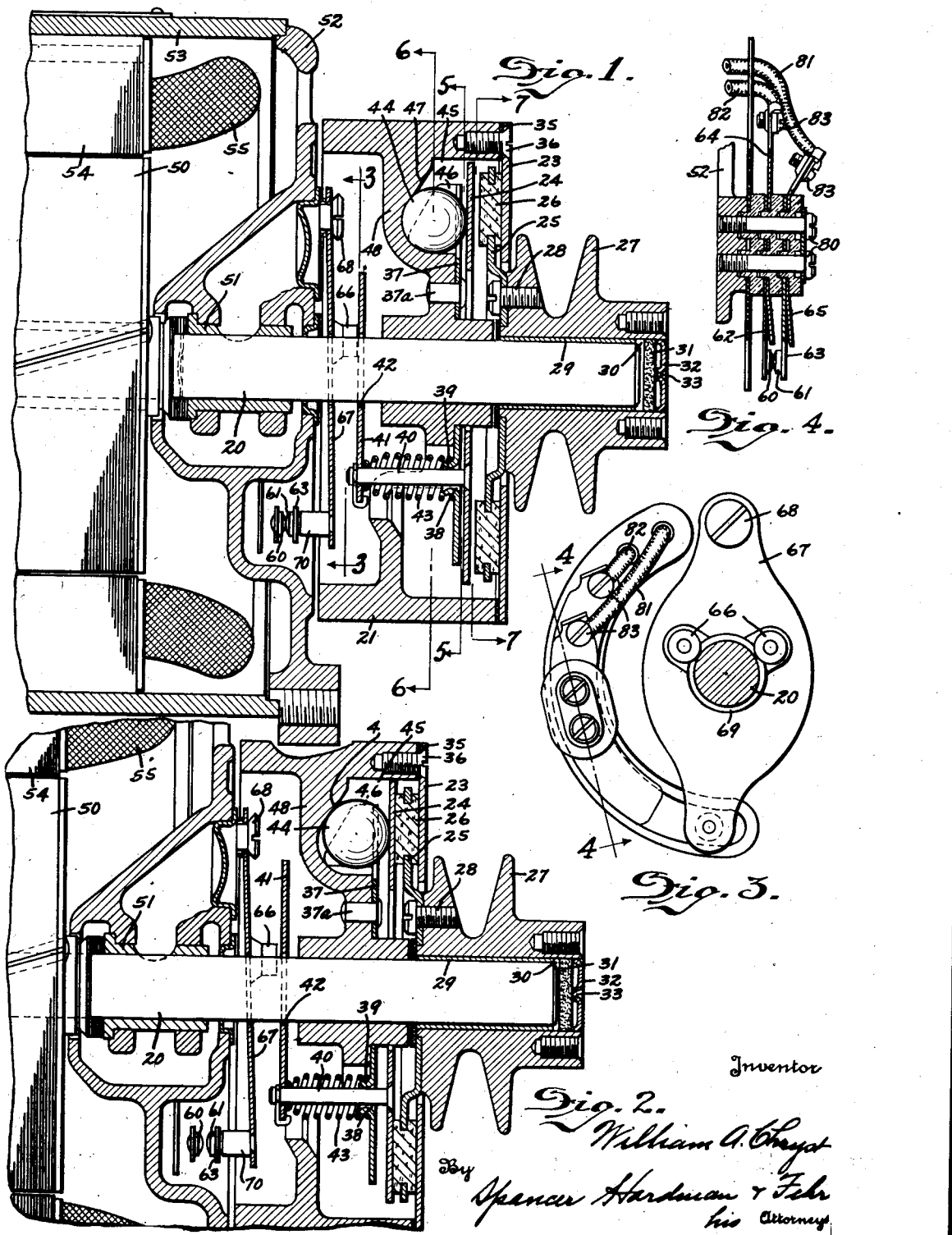

Inventor
William A. Chryst
By Spencer Hardman & Fehr
His Attorneys

Patented Jan. 26, 1932

1,842,820

UNITED STATES PATENT OFFICE

WILLIAM A. CHRYST, OF DAYTON, OHIO, ASSIGNOR TO DELCO-REMY CORPORATION, OF DAYTON, OHIO, A CORPORATION OF DELAWARE

CENTRIFUGAL CLUTCH AND SWITCH

Application filed July 10, 1928. Serial No. 291,629.

This invention relates to centrifugal clutches for connecting a driving member with a member to be driven after a certain speed of the driving member has been attained, and also relates to speed responsive control of a circuit of an electric motor such as an induction motor which may be used to operate the driving member.

One of the objects of the present invention is to provide an improved centrifugal clutch which is rugged and durable in construction, reliable in operation and which may be produced at relatively low cost.

Another object of the invention is to provide a speed responsive switch which will operate in conjunction with the centrifugal clutch referred to.

Another object of the invention is to provide a unitary structure for connecting a power operated shaft with mechanism to be driven thereby, said unitary structure comprising a flywheel and means for connecting it with the power operated shaft, a pulley or other power transmitting member and a centrifugal clutch for connecting said member with the pulley.

Further objects and advantages of the present invention will be apparent from the following description, reference being had to the accompanying drawings, wherein a preferred form of embodiment of the present invention is clearly shown.

In the drawings:

Fig. 1 is a longitudinal sectional view of a unitary structure embodying the present invention and comprising a centrifugal clutch and centrifugal switch.

Fig. 2 is a view similar to Fig. 1 showing the clutch engaged and the switch open.

Fig. 3 is a side elevation of the switch and is viewed on the plane of the line 3—3 of Fig. 1.

Fig. 4 is a sectional view on the line 4—4 of Fig. 3.

Figure 5:
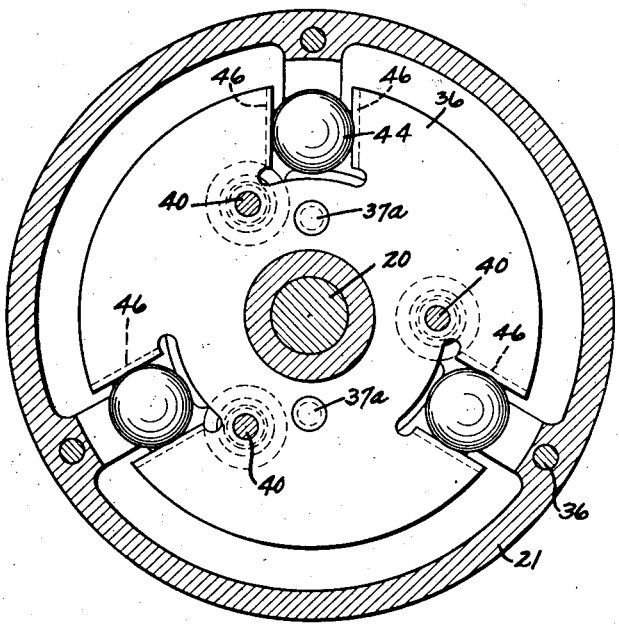
Figure 7:
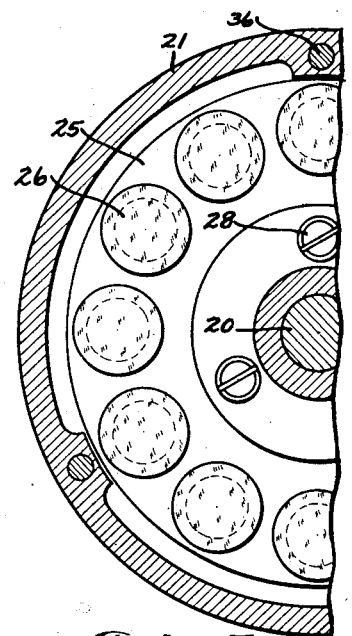
Figure 6:
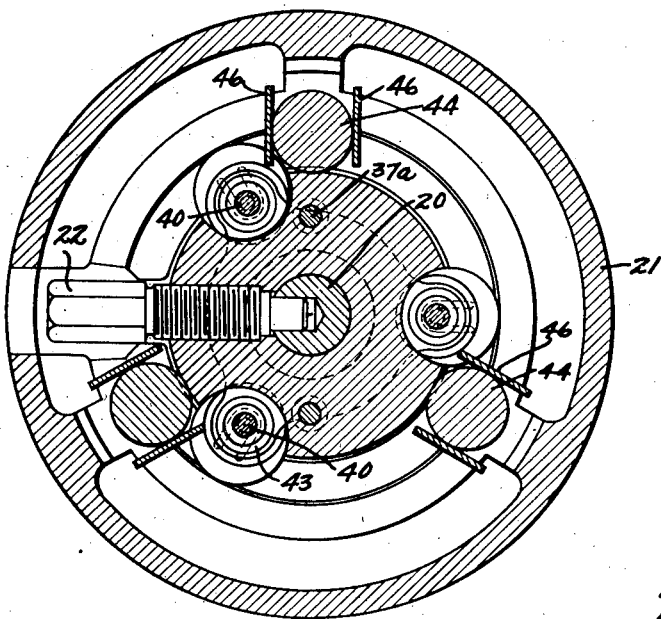

Figs. 5, 6 and 7 are sectional views on the lines 5—5, 6—6 and 7—7 respectively of Fig. 1, Fig. 7 being a fragmentary view.

The unitary power transmitting structure which may be attached to a driving shaft indicated by numeral 20 comprises a flywheel 21 attached by a set screw 22 (see Fig. 6) to the shaft 20, a driving clutch plate 23, a floating driving clutch plate 24, a driven clutch plate 25 carrying friction inserts 26, and a driven pulley or other transmitting device 27 to which the plate 25 is attached by screws 28. The pulley 27 is provided with a bearing 29 journalled upon the shaft 20. The bearing 29 is formed preferably of a porous metallic structure capable of absorbing lubricant which is fed to it from a small reservoir 30 provided by that portion of the hub of pulley 27 which extends beyond the end of the shaft 20. One wall of the reservoir 30 is provided by plug 31 of felt or other fibrous oil absorbing material and the plug 31 is retained in position by a metal plug 32 through which oil may be squirted through a hole 33.

The plate 23 and a paper gasket 35 are attached by screws 36 to the flywheel 21. The driving plate 24 is supported for rotary and axial movement by the flywheel 21. To accomplish this a plate 37 is attached to the flywheel 21 by rivets 37a and is provided with apertures 38 each surrounded by an annular flange 39 which provides a guide bearing for a stud 40 attached at one end to the plate 24. There are preferably three studs 40 for supporting the plate 24 for endwise movement. The studs 40 are each attached at their other ends to a plate 41 having a central aperture 42 for receiving the shaft 20. Springs 43 each surrounding a stud 40 are confined in an initial state of compression between the plate 41 and the plate 37 and yieldingly urge the plate 24 away from the plate 23 in order that the driven plate 25 will be normally disconnected from the driving plates 23 and 24. The speed responsive means for moving the plate 24 toward the plate 23 in opposition to the action of the springs 43 includes a plurality of balls 44 each of which is guided for radial movement by the walls of a pocket 45. Each pocket 45 is defined by a portion of the plate 24, by a pair of parallel ears 46 integral with the plate 37 and by a surface 47 provided by the web 48 of the flywheel 21, said surface 47 being oblique to the plane of the plate 24. It is therefore apparent that as the speed of the shaft 20 increases, the balls 44 will move radially outward and in an oblique path due to engagement with the oblique surfaces 47. Therefore the plate 24 will be moved toward the right in the drawings and will be wedged against the friction inserts 26 of the plate 25 and will cause them to be frictionally engaged also with the plate 23, as shown in Fig. 2. Thus, above a certain predetermined speed of the shaft 20, the shaft will be connected with the pulley 27 through the friction clutch provided by the plates 23 and 24 and inserts 26. As the speed of the shaft decreases, the springs 43 will be increasingly effective to move the plate 24 out of frictional engagement with the inserts 26 and to cause the plate to force the balls 44 against the oblique surfaces 47 so that the balls will finally be returned to normal position shown in Fig. 1. Thus the friction clutch will be disengaged below a certain speed of the shaft 20. There is clearance between the pulley 27 and the hub of the flywheel 21 so that the inserts 26 may move endwise away from the plate 23.

The centrifugal means for controlling the clutch operates also to control an electric circuit for an electric motor which drives the shaft 20. As shown, this motor may be an induction motor having a squirrel cage armature 50 carried by the shaft 20 which is journalled in a plurality of bearings, one of which is shown at 51 supported by the frame 52 of the motor. The motor includes a field frame 53 carrying stator pole pieces 54 and stator windings 55. The induction motor is provided with a starter circuit which is maintained normally closed by a pair of switch contacts 60 and 61 carried by leaf spring conductors 62 and 63 respectively connected with terminal plates 64 and 65 respectively. These parts are insulatingly supported by the motor end frame 52, with the parts 62 and 64 in engagement and parts 63 and 65 in engagement as shown in Figs. 3 and 4. The leaf spring 63 is normally biased so as to maintain the contact 61 separated from the contact 60. When the motor is at rest the contact 61 is held in engagement with the contact 60 due to the action of the springs 43 which press the plate 41 against two projections 66 extending from a plate 67 which is pivoted upon a screw 68 so as to swing laterally relative to the motor end frame 52. The plate 67 is provided with a central hole 69 for receiving the shaft 20, the shaft preventing the plate 67 from rotating about the screw 68. The free end of the plate 67 carries a stud 70 which bears against spring conductor 63 and maintains the contact 61 in engagement with the contact 60.

When the balls 44 move outwardly to engage the clutch members, the plate 41 is moved toward the right from the position shown in Fig. 1 to that shown in Fig. 2, in order to permit the plate 67 to swing away from the motor frame 52 and to permit the spring conductor 63 to separate the contact 61 from the contact 60.

The centrifugal clutch and switch mechanism may readily be disassembled. After removing the set screw 22, the unitary assembly of flywheel, pulley, centrifugal clutch and centrifugal switch controller 41 may be removed from the shaft 20. After removing the screw 68, the plate 67 may be removed from the motor. After removing the screws 80 which attach the switch members to the frame and after disconnecting the wires 81 and 82 from the switch members by removing the screws 83, the switch contacts and terminals may be removed from the motor.

While the form of embodiment of the present invention as herein disclosed, constitutes a preferred form, it is to be understood that other forms might be adopted, all coming within the scope of the claims which follow.

What is claimed is as follows:

1. A ball spacer for a centrifugal clutch, comprising in combination, an annular ball support having a series of ball receiving pockets, said ball support including a series of inclined surfaces arranged about the hub of the support, each of said surfaces forming a wall for its respective pocket and a plate having a series of pairs of ears extending inwardly, each pair of ears forming walls for a pocket, said plate being attached to the hub of said support.

2. A combined flywheel, clutch and driven-member unit adapted to be mounted upon a drive shaft and comprising, in combination, a flywheel having its web portion narrower than its rim; a plate attached to one side of the rim and cooperating with the rim and web to define a chamber within the confines of the rim; a pulley; a driven member attached to the pulley; and a centrifugal means located wholly within said chamber and guided thereby for connecting the flywheel with the driven member.

3. A combined flywheel, clutch and driven-member unit adapted to be mounted upon a drive shaft and comprising, in combination, a flywheel having its web portion narrower than its rim; a plate attached to one side of the rim and cooperating with the rim and web to define a chamber within the confines of the rim; a pulley; a driven plate attached to the pulley, said driven plate member being located between the flywheel plate and flywheel web; and centrifugal means within said chamber and guided thereby for causing the two plates to be engaged.

4. A combined flywheel, clutch and driven-member unit adapted to be mounted upon a drive shaft and comprising, in combination, a flywheel having its web portion narrower than its rim; a plate attached to one side of the rim and cooperating with the rim and web to define a chamber within the confines of the rim; a driven plate adjacent to the flywheel; said driven plate being located between the flywheel plate and flywheel web; a third plate driven by the flywheel and located between its web and the driven plate and axially movable relative to the flywheel; and centrifugal means within said chamber and guided thereby for causing the driven plate to be gripped by the other plates.

5. A centrifugal clutch according to claim 4, in which the centrifugal means comprises weight members driven by the driving member and guided thereby for lateral oblique movement relative thereto and engageable with the third plate.

In testimony whereof I hereto affix my signature.

WILLIAM A. CHRYST.